INVENTOR:
Arthur F. Eckel
BY Kent W. Wonnell
ATTORNEY.

Feb. 24, 1942.  A. F. ECKEL  2,273,847
COLLINEAR REFLECTOR
Filed Aug. 22, 1938  2 Sheets-Sheet 2
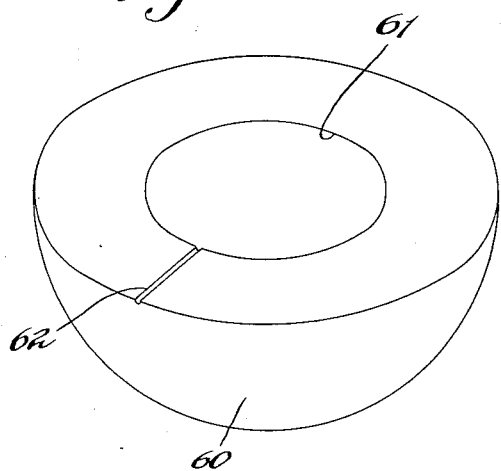
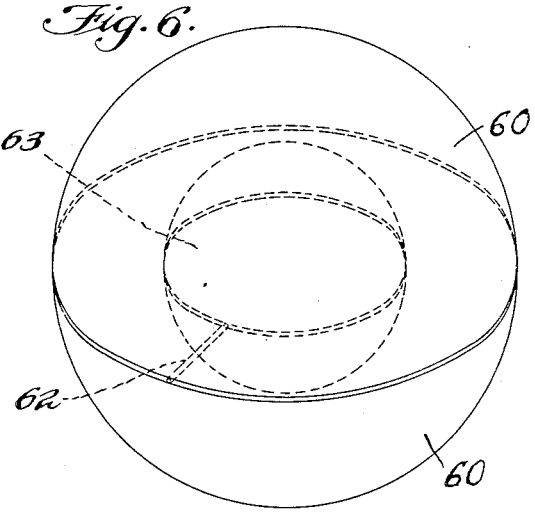
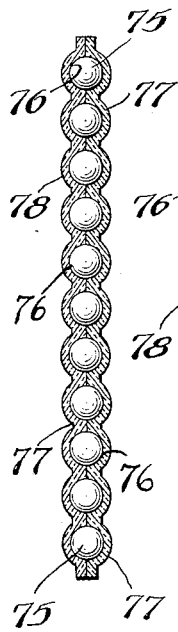
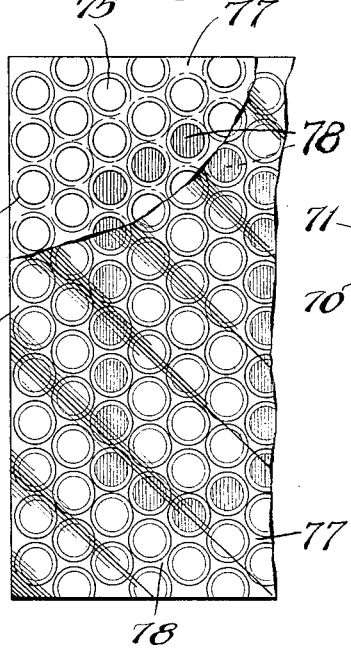
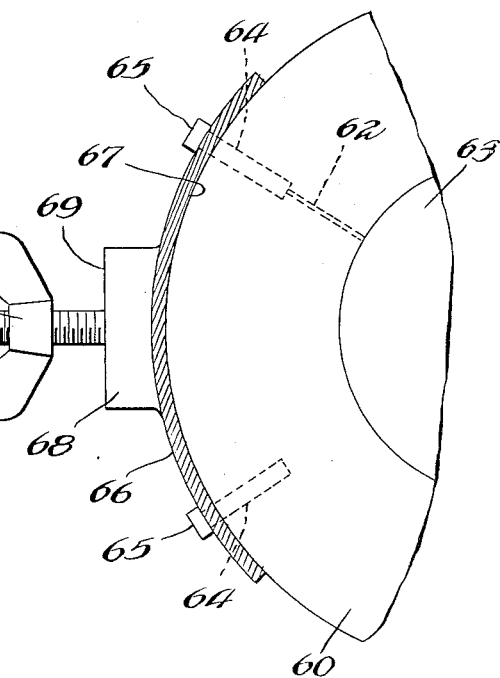
INVENTOR:
Arthur F. Eckel
BY Kent W. Worrell
ATTORNEY.

Patented Feb. 24, 1942

2,273,847

UNITED STATES PATENT OFFICE 2,273,847

COLLINEAR REFLECTOR

Arthur F. Eckel, Chicago, Ill.

Application August 22, 1938, Serial No. 226,059

4 Claims. (Cl. 88—82)

This invention relates in general to a reflecting unit, or system, particularly used in highway advertising signs and safety signals, sometimes in the form of a reflector button, or a plurality of such buttons to form a roadway directional or indicator sign, but having a more general use wherever applicable.

An important object of the invention is in the provision of a collinear reflecting unit included in an optical system, having a wide field angle or aspect of vision in which the effective optical aspect is constant for the entire field.

A further object of the invention is in the provision of a reflecting unit or an optical system comprising two or more refracting mediums.

A still further object of the invention is in the provision of an optical system comprising units having two or more spherical refracting curves employing two or more media of different refractive indices.

A further object of the invention is in the combination of a plurality of refracting media having different indices of refraction for producing a greater ray converging effect because of the finite separation of the optical surfaces, thereby shortening the effective focal length of the unit and resulting in a unit of shorter length along the principal axis and thus in the saving of a material amount of glass or other refracting media.

Other and further objects of the invention will appear hereinafter and from the accompanying drawings, in which Fig. 1 is a diagrammatic view illustrating the converging action of a two media reflecting unit;

Fig. 5 is a perspective of a portion of one of the reflector units;

Fig. 6 illustrates a spherical two media reflecting unit;

Fig. 7 illustrates the means for supporting and attaching a spherical unit;

Fig. 8 is a sectional view of a reflecting plate embodying a combination of two media reflecting units; and Fig. 9 is a face view of a portion of a reflecting plate as shown in Fig. 8.

Figure 1:
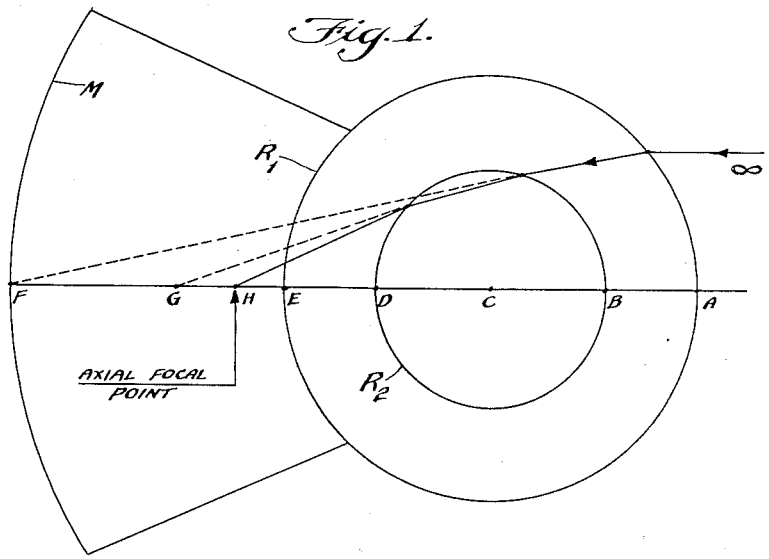

The conventional collinear reflector button used in highway advertising signs and safety signals has an exceedingly small aspect of field angle in which the intensity of reflection falls off at a rapid rate as the angle of obliquity of an incident ray deviates from head-on or the principal axis. Furthermore, the effective aperture for beams intercepted at angles oblique to the principal axis is simply a slit which narrows rapidly as the incident beam becomes appreciably more oblique which renders the button inoperative except for a narrow field at each side of the principal axis.

A conventional reflector button of this type has a spherical refracting surface whose radius of curvature is R and whose back, reflecting, or focal surface is situated at an axial distance of $$F = R\frac{n}{n-1}$$

measured from the vertex of the refracting surface, where $n$ is the index of refraction between glass and air. The radius of curvature of the back reflecting surface is $$\frac{R}{n-1}$$

measured from the common center of curvature. As referred to in Fig. 1 this means that in order for a reflector button having an outer radius of curvature $CA=R$ to have a back reflecting surface at the proper location for a single reflecting and refracting medium such as glass, the point F or the distance AF from the above formula substituting 1.5 as the index of refraction for glass as the value of $n$, $$F = R \times \frac{1.5}{1.5-1} = 3R$$

In other words the back reflecting surface is three times the distance of the radius of curvature of the outer portion of the button from the vertex A and the back or reflecting surface must have some shape such as indicated in outline M in order to constitute a proper collinear reflector.

The present invention anticipates the requirements of such an optical system and provides a collinear reflecting unit with approximately a 130° total field and at the same time operates so that the effective optical aperture, the exit-entrance pupil, is constant for the entire 130° field.

This optical system comprises two or more spherical refracting curves or aspherical refracting curves, cartesian ovals, paraboloids, ellipsoids, or hyperboloids, employing two or more media (two in this case) of different refractive indices on either side of the respective surfaces of separation which have a total converging power greater than a single refracting surface; if the said single refracting surface has a radius of curvature equal to the curvature of the first refracting surface encountered by a ray entering the system and whose index of refraction is the greatest occurring in the system.

This greater converging power comes as a result of the effect of the finite separation of the optical surfaces and can be better understood and shown by referring to the equations for axial image positions, where the equations are set down for each refracting surface encountered and each new image distance becoming the new object distance to the next surface, corrected for the thickness or separation between surfaces. This greater converging power can also be seen by actual ray tracing.

Figure 2:
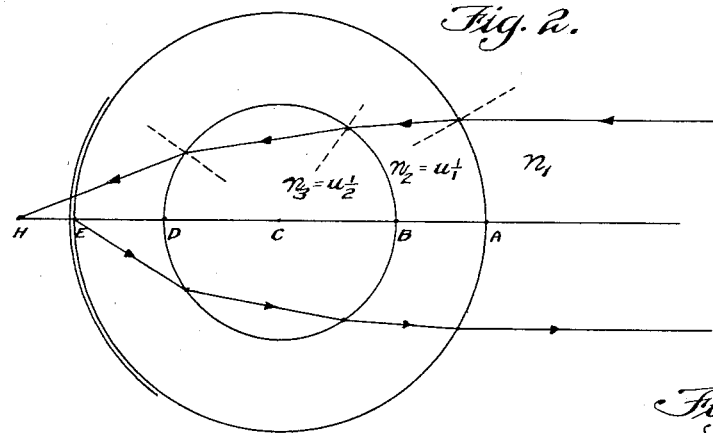
Fig. 2 is a diagrammatic view showing the converging effect of a two media reflector.

Referring to Figs. 1 and 2, the equations for object and image distances employing the indices of refraction and radii for the system shown in Fig. 2 are as follows:

(a) $$\frac{n_2}{U_1^1} = \frac{1-n_2}{R_1}$$

(b) $$\frac{n_3}{U_2^1} - \frac{n_2}{U_1^1 + (R_1 - R_2)} = \frac{n_2 - n_3}{R_2}$$

(c) $$\frac{n_2}{U_3^1} - \frac{n_3}{U_2^1 + 2R_2} = \frac{n_2 - n_3}{R_2}$$

in which $AF = U_1^1$
$BF = U_2 = U_1^1 + BA = U_1^1 + (R_1 - R_2)$
$GB = U_2^1$
$CA = R_1$
$CB = R_2 = CD$
$AB = d_1 = R_1 - R_2$
$DB = d_2 = 2R_2$
$DH = U_3^1$
$(DE)$ can be equal to $U_3^1 = R_1 - R_2$.

all radii occurring in the equations being intrinsically positive, and $n_1$ is the index of refraction of air before the ray enters the system from infinity, the first medium of the system having an index of refraction $n_2$ with a corresponding focal length $$U_1^1$$

and the central medium having an index of refraction $n_3$ corresponding to a focal length of $$U_2^1$$

The third surface whose curvature is $R_3$ has the same index of refraction $n_2$ as the first medium. An inspection of the three Equations $a$, $b$ and $c$ in connection with Fig. 1 shows that if there is only one medium entered by the ray the focal point will be at F; if the ray then enters a second medium $n_3$ the focal point of the ray will be converged to the point G; and if the ray is again deflected by the rear surface the axial focal point of the ray is at H.

Thus it is apparent that by a suitable choice of radii and indices of refraction the focal point of the system can be made to occur at the point E; or the focal point can be brought close enough to the rear surface $R_1$ so that this surface serves the two-fold purpose of employing the front part to act as a refracting surface and the rear part to act as the reflecting surface. However, for the system to function advantageously it is not necessary that the focal point H be brought entirely to the point E as a constant aperture and a constant increased field of view merely increase as H approaches closer to E.

Figures 3, 4:
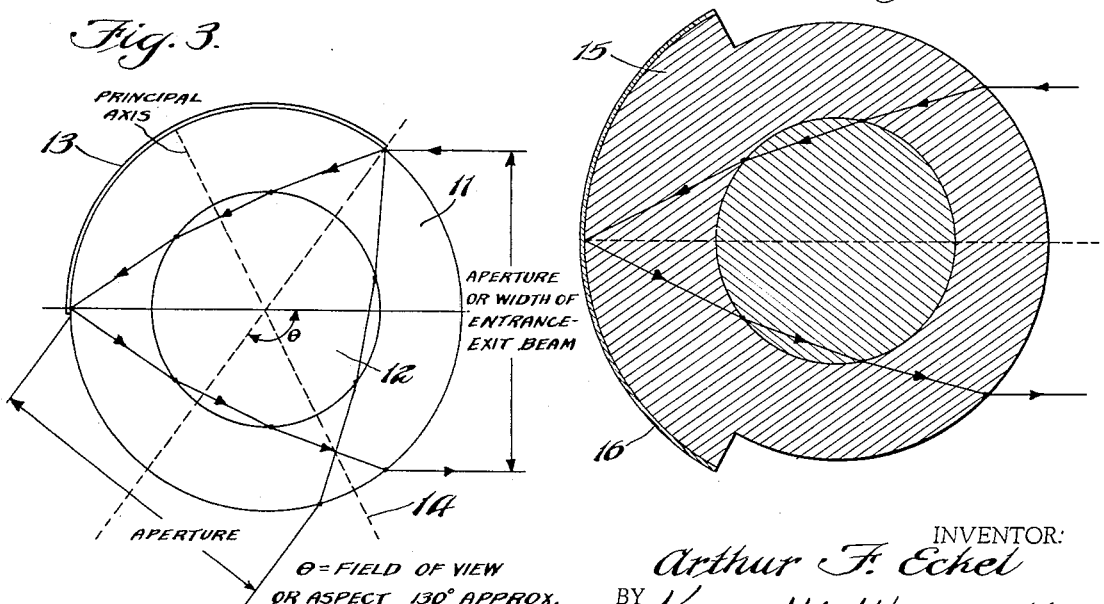
Fig. 3 is a diagrammatic view of a two media reflector showing the width of field and the wide angle of aspect which is possible.
Fig. 4 is a diagrammatic view similar to Fig. 2 showing a modification of the reflector portion.

As shown in Fig. 3 a reflecting and refracting system including two different concentric reflecting and refracting media 11 and 12 spherical in form and one within the other, has a mirrored reflector 13 at both sides of a principal axis 14, and by choosing proper indices of refraction for these two media the incident rays will be converged and reflected in a beam of considerable width thereby, the field angle of vision being over an angle $\theta$ which is approximately 130°, this arrangement at the same time preserving the constancy of the effective aperture of the system for the entire field of 130° through which the system functions.

When the focal reflecting plane is at the point E and thus becomes a continuation of the first spherical refracting surface $R_1$, then $$U_3^1 = R_1 - R_2$$

and Equation $c$ from above becomes equation (d) $$\frac{n_2}{R_1 - R_2} - \frac{n_3}{U_2^1 + 2R_2} = \frac{n_2 - n_3}{R_2}$$

From the three simultaneous Equations $a$, $b$ and $d$, $$U_1^1 \text{ and } U_2^1$$

can be eliminated so that there may be an explicit solution for the radius of curvature $R_2$ in terms of $n_2$, $n_3$, and $R_1$ treated as arbitrary constants.

The radius of curvature of the back reflecting surface, however, measured from the common center of curvature is $$\frac{R_1 R_2 n_3 (n_3 - 2n_3) + R_2^2 n_3^2 (n_2 - 1)}{2R_1 n_2 (n_2 - n_3) + R_2 n_2 n_3 (1 - n_2)} + R_2$$

For the condition that the final image focuses on $R_1$, and the image distance measured from the third refracting surface $R_3$ equals $R_2$, the implicit relation is that $R_1$ equals the above algebraic relation.

Practically the value of $R_2$ can be obtained more quickly by employing the method of ray tracing, or by graphical analysis. Typical values for a practical unit with a compromise adjustment for spherical aberration gives the following result:

$n_1 = 1.000$
$n_2 = 1.5200$
$n_3 = 1.6500$
$n_4 = 1.5200$
$R_1 = 25.0$ m m
$R_2 = 12.5$ m m
$R_3 = 12.5$ m m
$d_1 = 12.5$ m m $= R_2$
$d_2 = 25.0$ m m $= R_1$

Thus it will be apparent that a reflector embodying materials having specific different indices of refraction may be made up in spherical form as represented by Fig. 3 having a circular mirrored surface 13 or if different sizes of the different media are utilized a substantially spherical reflector with a curved addition 15 as shown in Fig. 4, may be adopted, having a silvered surface 16 at the outer face of the added portion.

Both of these forms will provide a collinear reflecting unit with a wide total field in which the effective optical aperture is substantially constant for the entire field, and a plurality of these buttons or units may be arranged together or in any shape or configuration to provide a directional or display sign having any desired distinguishing characters thereon.

In Fig. 5 is shown a half spherical unit 60 having a central semi-spherical depression 61 with a small groove 62 leading from the outer surface to the inner depression. This member 60 may be molded of glass, resin or other suitable material, two of the members placed together and cemented or compressed (if resin) to a single spherical unit (as shown in Fig. 6) and the central opening may be filled with a spherical ball of glass 63, resin, or liquid, the vent formed by registering grooves 62 being then filled up to form a complete reflecting unit.

In order to mount and use spherical units of this kind a circular glass or resin shell composed of semi-circular units 60 enclose a spherical center 63 of resin, glass or liquid, filled (if liquid) through a vent groove 62 and the outer end of the vent groove or other suitable openings 64 being provided in the outer wall of the member 60 to engage fastening studs 65 by cementing or threading them therein. A curved plate 66 is engaged by the fastening stud 65 which may be cemented to the outer surface of the reflecting members 60 and the inner surface 67 of the plate forms a reflecting surface for the reflecting and refracting unit. From the back or outer surface of the plate extends a projection 68 with a flat outer surface 69 from which a threaded fastening stem 70 projects. Mounted for adjustment on this stem is a wing nut 71 or other similar fastening device by means of which the reflecting unit may be attached to any suitable support.

Instead of separately mounting each spherical unit, a plurality of reflecting-refracting units embodying the two media principle may be combined in a plate of any desired size or area in accordance with Figs. 8 and 9, in which a plurality of spherical units 75 of glass, resin, or other material, are suitably spaced apart and held in semi-spherical recesses 76 of opposite matching plates 77 having outwardly rounding projections 78 on opposite sides conforming to the curvature of the units 75. The spherical units are placed between two plates 77 of this kind which are then pressed together and either held by cementing them or by suitably confining the plates together about their edges. If suitably proportioned in size as set forth above and with their indices of refraction suitably chosen, the plates having an index of refraction, for example, of 1.50 and the units 75 having an index of 1.62, respectively and approximately, a reflector of this kind has a wide angle of aspect or field of view with a constant intrinsic intensity throughout the entire field, and in the form shown either side may be placed outermost and will constitute the reflector.

With a reflector plate as shown by Figs. 8 and 9 it is possible by varying the colors of the spherical units 75 to provide an outline or design in the plate such as letters indicating a stop, direction signals, or even a pictorial representation which may be illuminated and the light rays returned as in a collinear reflecting unit, such as a roadside sign. If the confining plates are clamped together the spherical elements 75 may be readily changed or interchanged to produce different color combinations or varied to form a new design at will.

Other and various combinations of forms, ingredients and indices of refraction may be combined to provide reflecting and refracting units and combinations of units without departing from the spirit and scope of the invention which consists of the provision of two or more media so combined as to increase the converging power of the system and therefore enlarge the angle of aspect or the optical field of the units.

I claim:

1. A collinear reflector unit comprising concentric adjacent spherical inner and outer materials in which the diameter of the outer material is twice the diameter of the inner material, the index of refraction of the outer material is approximately 1.50 and the index of refraction of the inner material is approximately 1.62.

2. In a collinear reflector and refractor, a plurality of spherical centers of a transparent medium, and a segment of a spherical transparent shell in semi-spherical form at each side enclosing each of the centers, the outer shell segments of each side being united in a common plate, and said two opposite plates enclosing the centers, the centers and said side plates having different indices of refraction and together forming a plate reflector unit of predetermined size and shape.

3. A reflector and refractor according to claim 2 in which the side plates are removable and separable from the centers, and the spherical centers are of different colors and interchangeable so that a distinctive design may be made thereby and changed between the plates at will.

4. A collinear reflector unit comprising inner and outer transparent, concentric, spherical media with continuous contacting portions in which the radius of the outer medium is approximately twice that of the inner medium, and the ratio of the index of refraction of the inner medium to that of the outer medium is approximately as 1.62 is to 1.50.

ARTHUR F. ECKEL.